E. WRIGHT.
Animal-Tether.
No. 221,651. Patented Nov. 11, 1879.
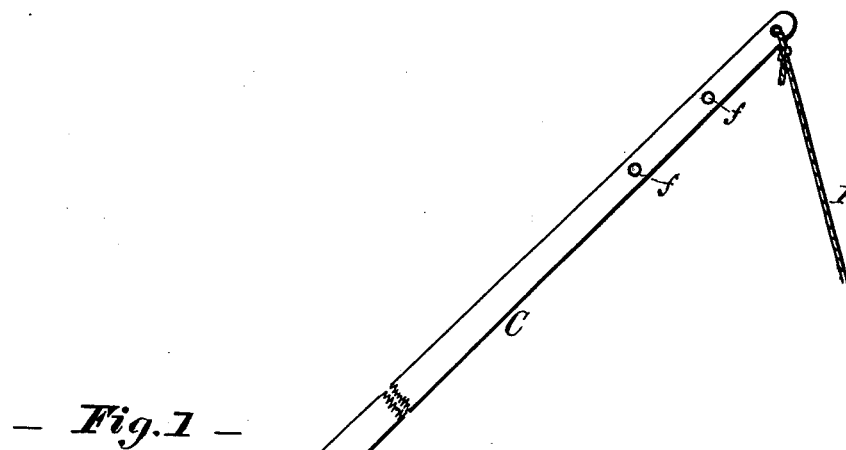
Fig. 1
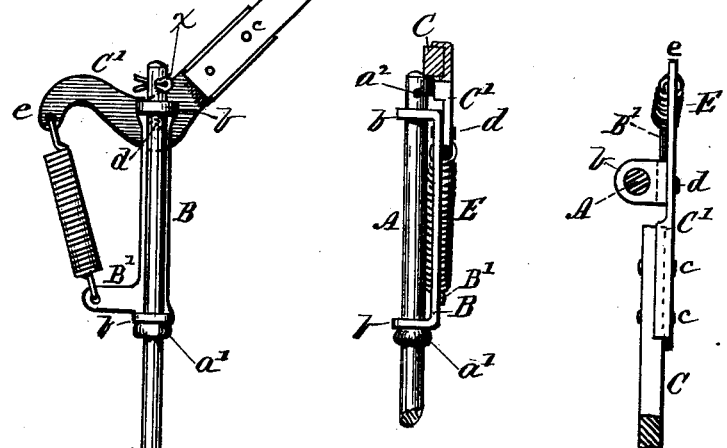
Fig. 2 — Fig. 3
Witnesses,
Geo. M. Reed
S. R. Barton
Inventor
Edward Wright
By Chas. H. Burleigh
Atty.

UNITED STATES PATENT OFFICE.

EDWARD WRIGHT, OF WORCESTER, MASSACHUSETTS.

IMPROVEMENT IN ANIMAL-TETHERS.

Specification forming part of Letters Patent No. 221,651, dated November 11, 1879; application filed August 28, 1879.

*To all whom it may concern:*

Be it known that I, EDWARD WRIGHT, of Worcester, in the county of Worcester and State of Massachusetts, have invented certain new and useful Improvements in Animal-Tethers; and I do hereby declare the following to be a description of my said invention sufficiently full, clear, and exact to enable others skilled in the art to which it appertains to make and use the same, reference being had to the accompanying drawings, which form a part of this specification, and in which—

Figure 1 represents a side view of my improved animal-tether. Fig. 2 is a front view of the same, the bars being shown in section; and Fig. 3 is a plan view of the parts.

The object of my invention is to provide a convenient device embracing in its structure elements which render it capable of use as an animal-tether, and also as a crow-bar, and cheaply producing a very serviceable and useful implement for the use of farmers and others.

My invention consists in an implement for tethering animals, the several parts of which are constructed, arranged, and adapted for use as hereinafter described.

In the drawings, A denotes the bar or supporting-stake; B, the head-frame; C, the sweep-lever, and E the balance-spring.

The bar A is made of iron, with a hardened steel point at $a$, if desired, its size and form being similar to the ordinary crow-bars employed for handling stones and other farm purposes. A collar, $a'$, is secured to the bar A, and near its upper end is a hole, $a^2$, as indicated.

The head-frame B is provided with suitable rings or ears $b$, which slip over the bar A and retain the parts in connection, the head being sustained by the collar $a'$, so as to be free to swivel or swing around on the bar when set into the ground G for use.

The sweep pole or lever C is secured to a plate, C', by bolts or rivets $c$ $c$, while said plate C' is pivoted to the head-frame B by a stud, $d$, in such manner that the lever C can swing up and down.

A balance-spring, E, of coiled wire is strained from a backward projection, $e$, on plate C' to an arm, B', on the head B, and serves to keep the outer end of the lever C elevated.

The tether-line F is attached by means of the holes $f$ at the forward part of the lever C.

A spring-pin, X, may be passed through the hole $a^2$, to prevent the head B from being raised from the bar A.

The operation of the device is to take up the slackness of the cord F as the animal attached thereto moves about, and will be fully understood without further explanation.

The supporting bar or post A is made with especial reference to its separate use as a crow-bar, its form, size, and material being such as to adapt it for such use when detached from the other parts by the removal of the pin X and the withdrawal of the bar from the ears $b$ $b$.

The construction of the parts is simple and convenient. The head B can be readily removed from the bar A when it is desired to use said bar for other than tethering purposes.

I am aware that balanced sweep-poles have heretofore been employed for tethering animals, and I do not herein make claim, broadly, to such feature.

What I claim as of my invention, and desire to secure by Letters Patent, is—

The combination of the bar A, pointed and having collar $a'$, the head-frame B, having rings or ears $b$, the plate C', pivoted at $d$ and carrying the sweep C, and the spring E, arranged for elevating said sweep, substantially as and for the purposes set forth.

Witness my hand this 25th day of August, A. D. 1879.

EDWARD WRIGHT.

Witnesses:
CHAS. H. BURLEIGH,
HERBERT P. BARTON.